Patented Sept. 3, 1929.

1,726,824

UNITED STATES PATENT OFFICE.

ELLERY H. HARVEY, OF LANSDALE, PENNSYLVANIA, ASSIGNOR, BY MESNE ASSIGNMENTS, TO PERKINS GLUE COMPANY, A CORPORATION OF DELAWARE.

VEGETABLE-GLUE BASE.

No Drawing.   Application filed January 26, 1923. Serial No. 615,152.

My invention relates to improvements in vegetable glue bases and more particularly to vegetable glue bases adapted for making glue of strong binding power especially such as is suitable for gluing up wood work as in furniture veneering.

In the past it has been common to select or prepare a suitable starch base for this purpose, the preparation of base being accomplished by treatment of starch with chemicals, as for example in the manner described in U. S. Reissue Letters Patent 13,436 or U. S. Patent 1,020,656 and when the treatment has been completed the chemicals have been neutralized or removed in order to prevent any further action thereof on the starch. Likewise it has been the practice to carefully keep separate from the dry glue base all chemicals which are to be used in connection with the solution of the base to form the glue until the final mixture of the glue is made with water and the dissolving chemicals.

I have discovered however that by proper selection and application of the chemical or chemicals or some of them to be used in connection with the solution of the starch base to form the adhesive glue, that it or they may be mixed with the dry starch and left therein for relatively long periods of time until it is desired to dissolve the base to form glue without material detriment to the resultant glue, and according to my invention in its preferred form the chemical so mixed with the dry glue base in advance not only aids in dissolving the base to form glue but also by proper proportioning of the same, serves to give the resulting glue the desired fluidity. By my improvements the proper proportioning of the chemical to the particular starchy carbohydrate used may be done in advance on large quantities of glue base and thus avoid serious trouble by reason of the glue mixing men in the factories where the glue is made up and used, failing to adopt proper proportions. That is, according to my invention, I am not only able to make substantial economies in the cost of manufacture of such glues but to produce, more cheaply than the ordinary modified starch used for this purpose, a new glue base composition that contains or embraces within itself constituents which without depending so largely on the judgment of the glue mixer, may suitably adjust the fluidity of his batch of glue at the time of mixing or dissolving the same.

As chemicals to use with the dry starch of this new glue base I prefer to use solid crystalline oxidizing salts of non-hydroscopic character pulverized to 100 mesh and to admix them intimately by machining with the starch in the dry condition. When I speak of dry starch I include, of course, starch containing the varying amount of water which usually accompanies the same in commerce but which is dry in the ordinary acceptance of that term, and the oxidizing agent is mixed therewith and remains mixed therewith, without the starch being converted thereby. I prefer also to accurately proportion the quantity of such oxidizing agent to the precise character of the starch and am enabled thereby to regulate or control the final viscosity of the resultant finished glue in a way and to a degree that has hitherto been unknown. For the starch I prefer to use cassava starch which comes in powdered form and is commonly known as tapioca flour. I prefer cassava starch or some such tuber starch because they are substantially free from gluten. Gluten is nitrogenous matter which is found with some starches particularly such as rye, wheat and corn before purification. Cassava and potato starches, even before purification, contain relatively little gluten. Gluten is if anything detrimental in my product and if oxidized it is even worse. Therefore, I preferably use starches which are substantially free from gluten. As oxidizing compound I prefer to use dry pulverized barium peroxide. The barium peroxide may be mixed with dry tapioca flour, preferably either in a grinding machine or in some form of mixer and it is best to make this mixing as thorough as possible so that the tapioca flour shall completely surround and permeate the barium peroxide. Thus prepared the base may be shipped and stored for a reasonable period in ordinary sacks provided it is well packed. The percentage of barium perioxide or other oxidizing compound used will vary with the character of the starch and the particular kind of glue desired, but if barium peroxide is used I preferably use less than 5% (actual $BaO_2$) based on the weight of the starch.

The base may be advantageously used for making different kinds of glues by dissolving the same in various proportions of water with caustic alkali in substantially the manner described in my copending application Ser. No. 589,549, filed Sept. 21, 1922, except the oxidizing agent is mixed with the dry starch to form a dry starch base which may be transported and stored until ready for use and the only chemical added at the time of dissolving the base to form the glue is or may be the caustic alkali.

Likewise the improved base is particularly advantageous for making a quick setting vegetable glue as described in my copending application Ser. No. 615,151, filed January 26, 1923.

The improved base lends itself to solution in water with the aid of a solvent of starch and simultaneous degeneration of the starch by the oxidizing agent, the proper amount of oxidizing agent for this purpose being determined in advance but the degree of degeneration of the starch being more or less within the control of the operator or glue mixer by his adjusting the temperature, time, and other conditions of dissolving.

Instead of barium peroxide there can be used with more or less success, highly oxidizing salts or compounds i. e. those which act on starch to reduce its viscosity, such as other alkaline peroxides, per-borates, per-carbonates, etc., but the peroxides I believe give the best results. It has been suggested to admix with a wheat or other starch, aqueous solutions of acids or dry powdered alkalies such as finely divided caustic soda or caustic potash. I find, however, that under some conditions these have an indeterminate action on the starch during the transit and storage and that, therefore, the resulting product is not reliable for use in making veneer glue. Furthermore if by any accident the material does become damp in storage or transit it is likely to be entirely ruined.

For this reason I prefer the peroxide of barium or other peroxide of an alkaline earth metal. The peroxide of sodium or potassium is not so desirable because of the highly hygroscopic character thereof which results in its decomposition due to moisture in the air and the fact that the moisture thus attracted promotes further accumulated decomposition of the peroxide. Hydrogen peroxide can be used provided the material is packed and stored in a proper manner but is not as advantageous as the barium peroxide. Certain of the persulphates can be applied with more or less satisfactory results. Bleaching powder can be used in certain cases but if used in sufficient quantity to produce enough action on the vegetable material its action is likely to proceed in the wrong direction and result in a glue which is only partially satisfactory.

From the above it will be apparent that many different materials may be used and the invention embodied in widely different forms and I therefore desire to cover all bases coming within the language or scope of any one or more of the appended claims.

What I claim and desire to secure by Letters Patent, is:

1. A vegetable glue base consisting of starch substantially free from gluten and in the substantially dry state physically admixed with a substantially non-hygroscopic oxidizing agent in dry form, without being converted by the latter.

2. A vegetable glue base consisting of a starch in the substantially dry state intimately and physically admixed with a substantially non-hygroscopic peroxide without being converted by the latter.

3. A vegetable glue base consisting of a starch in the substantially dry state physically admixed with an alkaline earth peroxide without being converted by the latter, said peroxide being adapted to render suitably fluid the finished glue obtained upon putting the base into solution.

4. A vegetable glue base consisting of starch in the substantially dry state having physically admixed therewith barium peroxide without being converted by the latter, said peroxide being adapted to render suitably fluid the finished glue obtained upon putting the base into solution.

5. A vegetable glue base consisting of a starch substantially free from gluten and in substantially dry powdered form physically admixed with a dry-powdered substantially non-hygroscopic peroxide without being converted by the latter, said peroxide being adapted to render suitably fluid the finished glue obtained upon putting the base into solution.

6. A vegetable glue base consisting of a starch in substantially dry powdered form having physically admixed therewith a powdered peroxide without being converted by the latter, said peroxide being adapted to affect the fluidity of and render suitably fluid the finished glue obtained upon putting the base into solution.

7. A vegetable glue base consisting of a starch in a substantially dry powdered form having intimately and physically admixed therewith less than 5% of substantially dry $BaO_2$ without being converted by the latter, said $BaO_2$ being adapted to render suitably fluid the finished glue obtained upon putting the base into solution.

8. A vegetable glue base consisting of a starch substantially free from gluten and in the substantially dry state having intimately and physically admixed therewith a substantially non-hygroscopic alkaline oxidizing agent in powdered form without being converted by the latter, said oxidizing agent being adapted to render suitably fluid the finished glue obtained upon putting the base into solution substantially as described.

In testimony whereof I have signed my name to this specification.

ELLERY H. HARVEY.